United States Patent [19]

Aschwanden

[11] 4,255,758

[45] Mar. 10, 1981

[54] SELF-ADJUSTING BELL FILTER CIRCUIT FOR USE IN SECAM CODERS

[75] Inventor: Felix Aschwanden, Thalwil, Switzerland

[73] Assignee: RCA Corporation, New York, N.Y.

[21] Appl. No.: 93,221

[22] Filed: Nov. 13, 1979

[51] Int. Cl.³ .............................................. H04N 9/40
[52] U.S. Cl. .................................................... 358/14
[58] Field of Search ............................ 358/12, 14, 904

[56] References Cited

U.S. PATENT DOCUMENTS

| | | | |
|---|---|---|---|
| 3,303,274 | 1/1967 | DeFrance | 358/14 |
| 3,365,541 | 1/1968 | Melchior | 358/14 |
| 3,471,635 | 10/1969 | Melchior | 358/14 |
| 3,969,762 | 7/1976 | Favreau | 358/14 X |

Primary Examiner—Robert L. Richardson
Attorney, Agent, or Firm—Eugene M. Whitacre; Paul J. Rasmussen; Henry I. Steckler

[57] ABSTRACT

A method and circuit for adjusting the frequency response of a bell filter in a SECAM camera samples the output signal from the filter. A frequency control voltage is applied to the filter in accordance with the sampled voltage.

11 Claims, 14 Drawing Figures

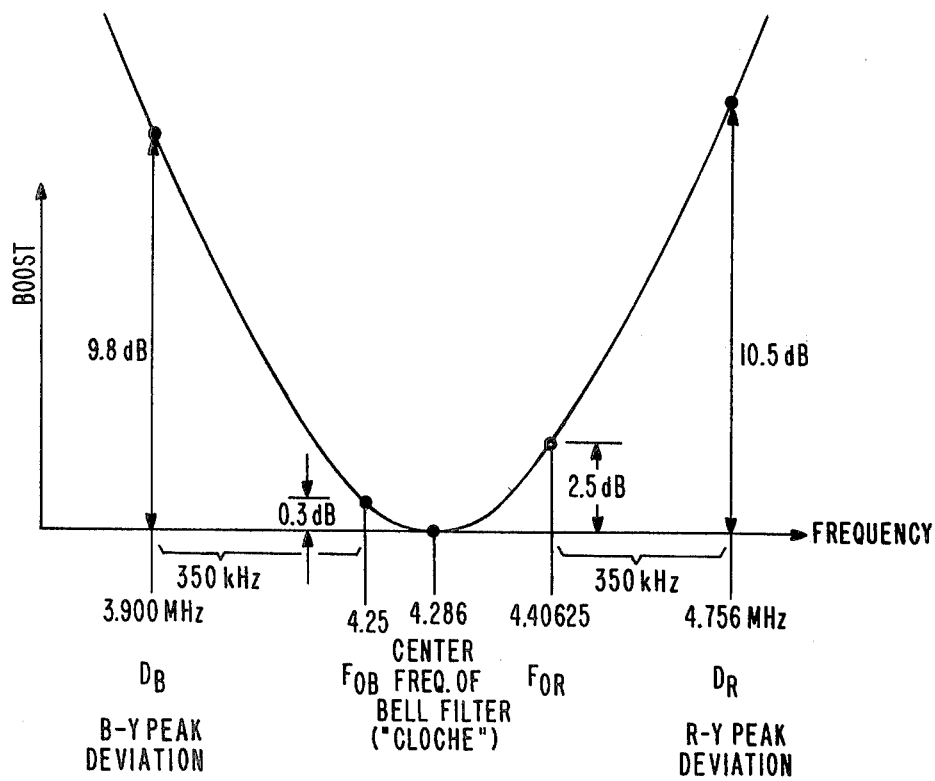
Fig. 2.
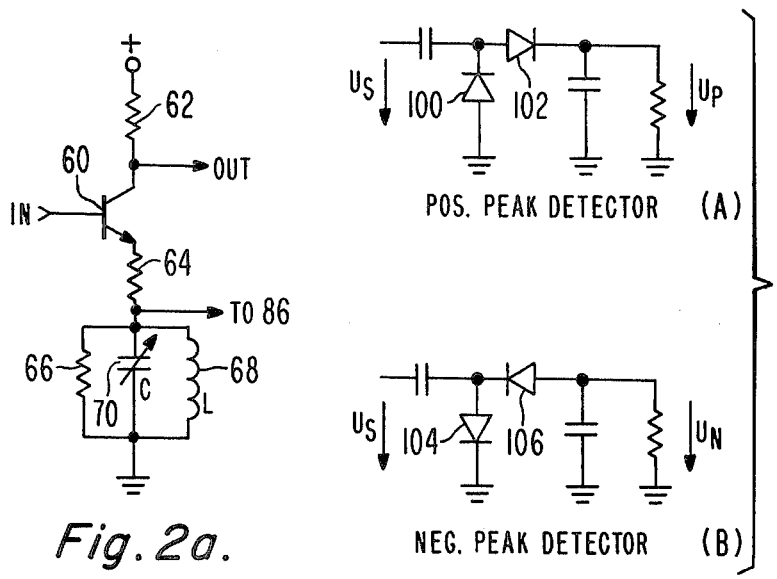
Fig. 2a.
Fig. 4.

Fig. 3B. fH/2

Fig. 3C. SYNC

Fig. 3D. SAMPLING SIG

SELF-ADJUSTING BELL FILTER CIRCUIT FOR USE IN SECAM CODERS

BACKGROUND OF THE INVENTION

The present invention relates to automatic frequency response control of a filter, and more particularly, to a filter having a bell shaped response such as is used in a SECAM TV camera encoder.

Recent developments concerning the French SECAM standard indicate that several tolerances of the SECAM system will be made much tighter in the future. This not only leads to problems in designing encoder circuits, but also makes it difficult to adjust SECAM encoders in the production line. Test equipment such as vectorscopes, which allow simple and precision adjustment of NTSC or PAL encoders, do not exist for SECAM. Therefore it is very desirable to introduce self-adjusting circuits in SECAM encoders.

One of the circuits used in a SECAM encoder is a notch filter having a bell shaped amplitude frequency response. This filter must have a stable frequency characteristic for proper encoding to take place. Unfortunately, the components comprising the filter have values that change with time, thus requiring periodic readjustment of the filter.

SUMMARY OF THE INVENTION

It is therefore desirable to provide a circuit and method for automatically adjusting a filter used in a SECAM TV camera.

In brief, this is achieved by sampling the amplitude of an output signal from the filter, and providing a control voltage to the filter in accordance with the sampled amplitude.

DESCRIPTION OF THE DRAWINGS

FIG. 2 shows a graph of the ideal frequency response curve of the bell filter, while FIG. 2a shows an embodiment of a filter;

FIG. 3a shows a circuit for automatically controlling the frequency response of the filter, while FIGS. 3b, c, d, and e show waveforms present in FIG. 3a;

FIG. 4 shows some circuits used in FIG. 3;

DESCRIPTION OF THE INVENTION

The SECAM system uses a frequency modulation of the subcarrier by the line sequential color difference signals. The center frequency of the color subcarrier is $F_{OB}=4.25$ MHz for the B-Y signal and $F_{OR}=4.40625$ MHz for the R-Y signal. The maximum deviation of the subcarrier is represented by $D_B$ and $D_R$ for the B-Y and R-Y signals respectively and should be kept to an accuracy of 10 kHz. During the occurrence of horizontal synchronization pulses, the modulator is resynchronized to $F_{OB}$ or $F_{OR}$.

Figure 1:
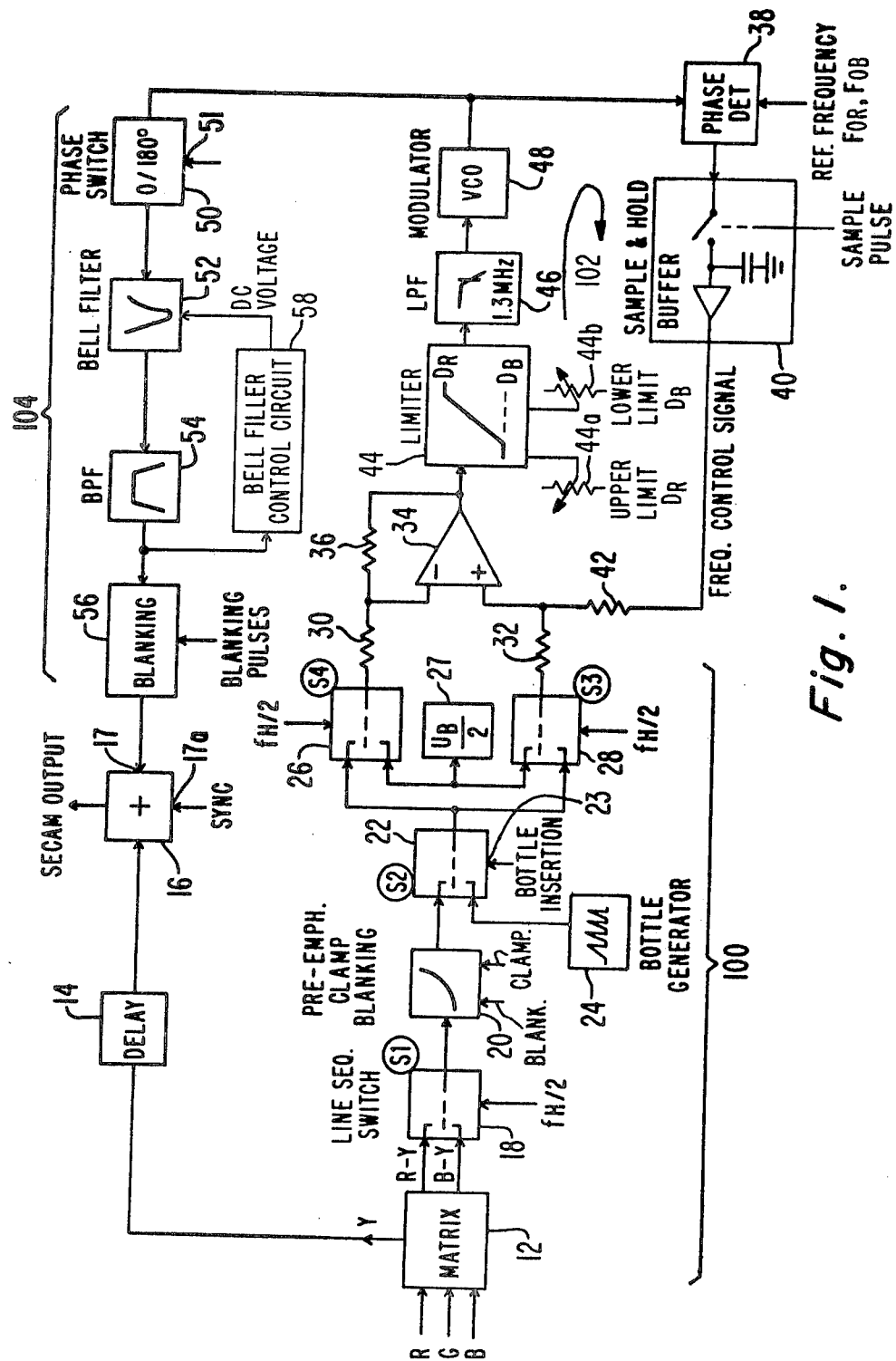
FIG. 1 is a block diagram of a SECAM encoder using the circuit of the invention.

FIG. 1 shows a circuit capable of doing this which uses the circuit of the invention. The first portion 100 is a baseband signal processing portion that takes three primary color signals and forms properly pre-emphasized and clamped line sequential signals having line identification signals. These signals are applied to a frequency control loop 102 that provides a baseband SECAM FM color signal from VCO 48 in accordance with the line sequential signals. The FM signal is then applied to a high frequency signal processing portion 104 that does alternate-line phase inversion, more pre-emphasis, and filtering.

Now examining FIG. 1 in more detail, the R, G, and B signals from an appropriate source, such as camera pickup tubes, are applied to a matrix 12. One output provides the luminance signal Y which is applied to a delay circuit 14, which compensates for the inherent circuitry delay that chrominance signals applied to input 17 of adder 16 undergo. From there the luminance signal is applied to adder 16, which also receives composite synchronization signals at input 17a. Color difference signals (R-Y, B-Y) are also produced by matrix 12, are alternately fed through line sequential switch 18, which receives a half line frequency switching control signal, ($f_H/2$), to a pre-emphasis, clamping and blanking circuit 20, which receives blanking and clamping pulses. In circuit 20, the color difference signals are given a low frequency pre-emphasis, in accordance with SECAM standards. Then they are clamped to a voltage $U_B/2$ during the blanking interval. From circuit 20 the color difference signals go to a switch 22. During the vertical identification period, which is a time period during the field blanking time when signals are sent that indicate which color difference signal is being transmitted, switch 22, which is controlled by a bottle insertion signal applied to control input 23, connects the sawtooth output signal of the bottle generator 24 (which is formally called a SECAM line identification signal generator) to the one input of each of the switches 26 and 28. At other times one of the color difference signals are applied to switches 26 and 28. Switches 26 and 28 are controlled by means of an $f_H/2$ signal, similar to the operation of switch 18. During the occurrence of the B-Y line, resistor 30 is connected to a voltage source 27 of value $U_B/2$ through switch 26, while resistor 32 is connected to the output of switch 22 through switch 28 so as to feed the B-Y signal to the non-inverting input of the amplifier 34. During the occurrence of the R-Y line, the output of switch 22 is connected to resistor 30 through switch 26 to the inverting input of amplifier 34. At the same time, voltage source 27 is connected by switch 28 to resistor 32 to the non-inverting input. This alternation of the color signals applied to amplifier 34 alternates the direction of deviation of the R-Y and B-Y color signals. Resistor 36 supplies negative feedback to control the gain of amplifier 34. Also a center frequency control signal generated by means of a phase detector 38, that receives during alternate lines the frequencies $F_{OR}$ and $F_{OB}$, and a sample-and-hold circuit 40, is added at the non-inverting input of amplifier 34 through resistor 42. The sample pulse for sample-and-hold circuit 40 comprises a horizontal synchronization pulse. This resynchronizes VCO 48 to the frequencies $F_{OR}$ or $F_{OB}$ during the horizontal synchronization period. After passing through an amplitude limiter stage 44, that controls the upper and lower deviation limits using potentiometers 44a and 44b respectively, and a low pass filter 46, which has a cutoff frequency of about 1.3 MHz, the output signal of amplifier 34 modulates the frequency of the voltage controlled oscillator 48 when it is not being resynchronized. The output of the voltage controlled oscillator 48 is applied to subcarrier phase switch 50, which receives a switching signal at input 51 to cause a 180 degree phase inversion each frame and also on one line out of every three in accordance with SECAM standards. The output of switch 50 is fed through a bell shaped response filter 52 to increase the color subcarrier amplitude during high subcarrier frequency deviation, which also is in accordance with SECAM standards. A band pass filter 54, which has a band pass of from 3 to 5.5 MHz, receives the output of filter 52 and applies it to a blanking circuit 56, which receives blanking pulses, before the FM color signal is added to the Y and composite sync signals by adder 16. A bell filter control circuit 58 (described below) is coupled to band pass filter 54 and bell filter 52 to control the frequency of the bell filter.

FIG. 2 shows the bell filter characteristic. It will be seen that filter 58 supplies a boost to the modulated signal as the deviation increases in a direction away from the center frequency of the bell filter, as is normal for a SECAM high frequency pre-emphasis circuit. The peak deviation in this direction from the unmodulated carrier frequencies $F_{OB}$ and $F_{OR}$ is 350 kHz and the resulting frequencies are called "$D_B$" and "$D_R$" respectively, and are controlled by potentiometers 44a and 44b respectively. The maximum allowed deviation towards the filter center frequency is 506 kHz. The filter is centered at 4.286 MHz and the Q factor is approximately 16. FIG. 2a shows a suitable filter circuit. A transistor 60 receives an input signal at its base and a D.C. supply voltage through resistor 62 at its collector, which is also the output for the circuit. Resistor 64 supplies D.C. bias to the emitter through inductor 68. A parallel tuned circuit comprising inductor 68 and capacitor 70 is coupled across a resistor 66. At its resonant frequency, which is between the unmodulated carrier frequencies, the tuned circuit has a high impedance so that resistor 66 is effectively in series with resistor 64. This increases the degeneration, and therefore reduces the gain at the resonant frequency. Away from the resonant frequency, the impedance is not as high. This causes a partial shunting action of resistor 66, thus increasing the gain. It will be seen that the curve having the shape of FIG. 2 results. The Q factor is determined by resistors 64 and 66, and therefore is very stable, while the center frequency is given by inductor 68 and capacitor 70, and therefore a periodic re-adjustment of these elements is required.

It can be seen in FIG. 2 that the bell filter can be adjusted to keep it properly tuned by keeping the amplitude ratios of $D_R/D_B = 10.5-9.8$ dB $= 0.7$ dB or $F_{OR}/F_{OB} = 2.5-0.3 = 2.2$ dB constant assuming that the respective frequencies are very stable. This stability is present for $F_{OR}$ and $F_{OB}$ which are typically derived from crystal controlled sources (not shown), but not for $D_B$ and $D_R$ which depend on the adjustments of the "upper limit" and "lower limit" control potentiometers 44a, 44b respectively of the limiter circuit 44 of FIG. 1.

Figure 3A:
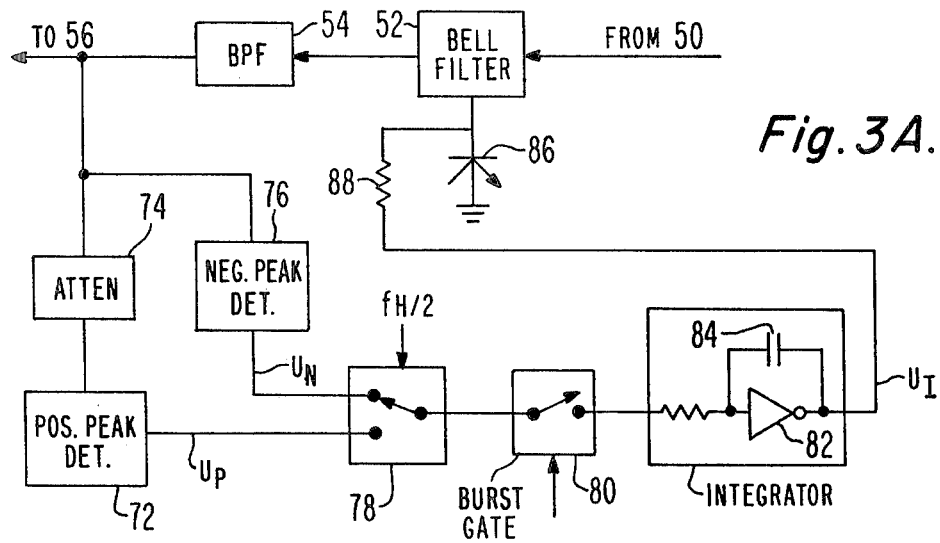
Figure 3E:
Figure 3E:
Figure 3E:
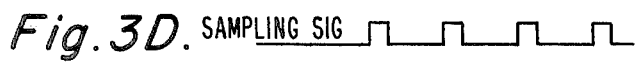
Figure 3E:
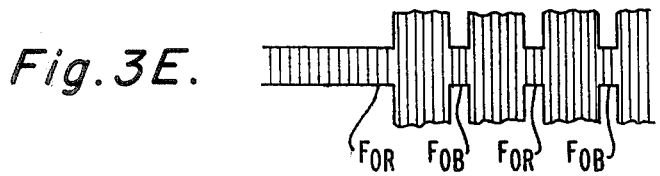

Shown in FIG. 3a is an appropriate bell filter control circuit 58 which uses the undeviated subcarriers $F_{OR}$ and $F_{OB}$ shown in FIG. 3e, which shows active video lines. The output signal of the BPF 54 shown in FIG. 3e is detected in a positive peak detector after 2.1 dB of attenuation by attenuator 74 and in a negative peak detector 76 (without attenuation). The negative peak measure voltage $U_N$ and the positive peak measure voltage $U_P$ from detectors 76 and 72 respectively are fed to a switch 78 which has the $f_H/2$ switching waveform of FIG. 3B applied to it. From there $U_P$ and $U_N$ are applied to a burst gate 80 which has the sampling signal of FIG. 3d applied to it. This sampling signal occurs between the end of the horizontal synchronization signal (FIG. 3c) and the beginning of an active video line (FIG. 3e). From gate 80 the sampled signal which alternately comprises $F_{OR}$ or $F_{OB}$, goes to an integrator circuit 82 and charge or discharge integrating capacitor 84 during the interval when the burst gate is closed. The output voltage $U_I$ of integrator circuit 82 controls the bell filter 52 characteristic by means of a varicap diode 86 coupled through a resistor 88 to integrator 82. When the filter 52 frequency is correct, equal positive and negative pulses are applied to integrator 82, and therefore no control voltage other than possibly a bias voltage is applied to voltage variable capacitor diode 86. If the frequency is incorrect, either positive or negative pulses will be greater, depending upon the direction of the frequency error, and a control voltage will be applied to varicap 86, so that the filter 52 is recentered on the correct frequency.

Figure 5:
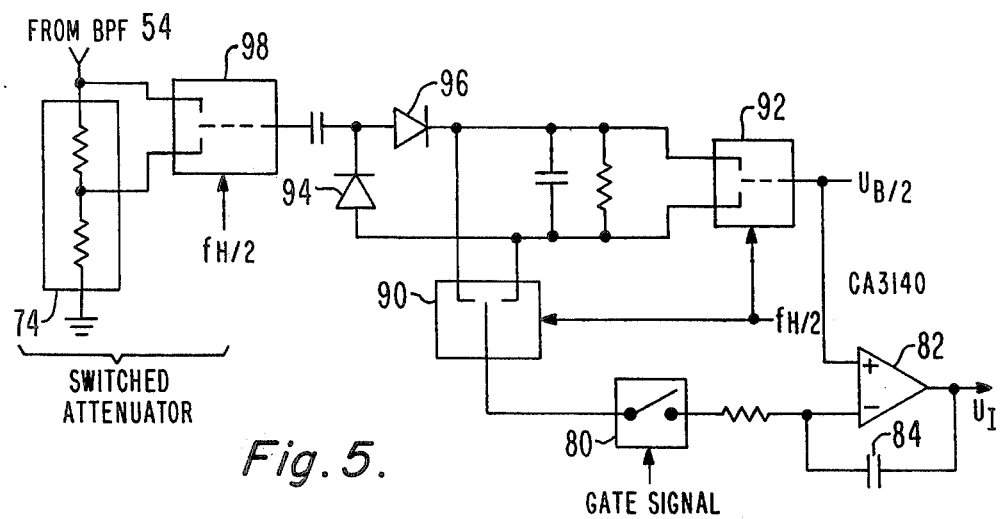
FIG. 5 shows how the two circuits of FIG. 4 can be replaced by a single circuit.
Figure 6:
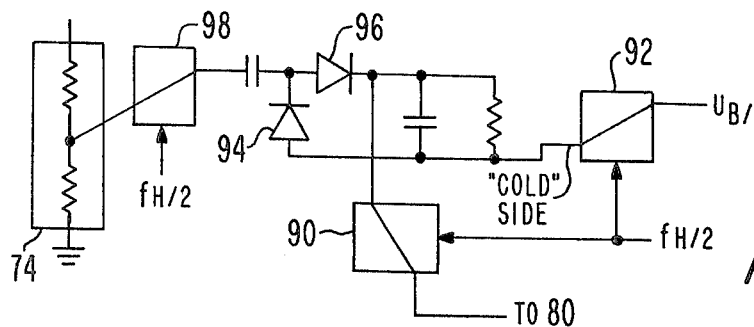
FIGS. 6 and 7 show the equivalent circuits of the circuit of FIG. 5.
Figure 7:
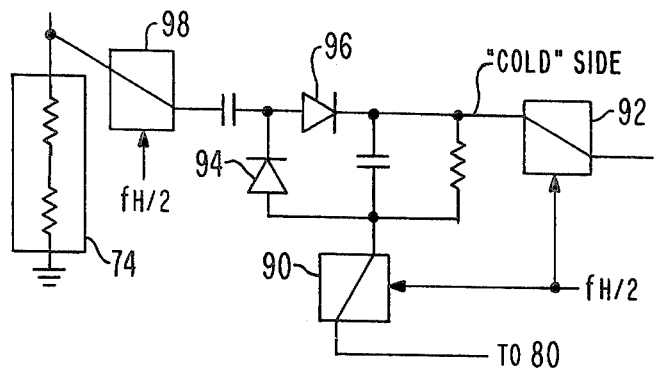

Positive peak detector 72 is illustrated in schematic detail in FIG. 4a, and negative peak detection 76 is illustrated in FIG. 4b. Differences between the characteristics of diodes 100 and 102 of FIG. 4a and diodes 104 and 106 of FIG. 4b may cause differences in the characteristics of the detections which may be a source of problems because $U_P$ and $U_N$ are never equal in amplitude for the same amount of input signals $U_S$ because of different voltage responses to the respective input signals. This problem can be solved by using the same diodes for the positive and the negative peak detector, as is shown in FIG. 5, where corresponding parts have been given corresponding reference numbers. By means of additional switches 90 and 92, the same diodes 94 and 96 are connected as a positive peak detector for the R-Y line and connected as a negative peak detector for the B-Y line. Another switch 98 switches attenuator 74 in for the R-Y and out for the B-Y line. FIG. 6 shows the signal path for the R-Y line, while FIG. 7 shows the signal path for the B-Y line. Again corresponding parts have been given corresponding reference numerals. Switches 90, 92, and 98 can be RCA type CD 4053 integrated circuits.

As mentioned earlier, it is also possible to detect the amplitudes of the output signals from bell filter 52 caused by the peak deviations $D_B$ and $D_R$ (shown in FIG. 2). The advantage is that the voltages $U_P$ and $U_N$ are higher in amplitude, and as a result, the input offset voltage of the integrator circuit 82 used (which can be RCA type CA 3140) does not have as great an effect on the accuracy of the control circuit as when using $F_{OR}$ and $F_{OB}$. The same circuit as shown in FIG. 5 can be used except that the attenuator is different (because the ratio $D_R/D_B = 10.5-9.8$ dB $= 0.7$ dB) and also a different gate signal (described below) is used.

Figure 8:
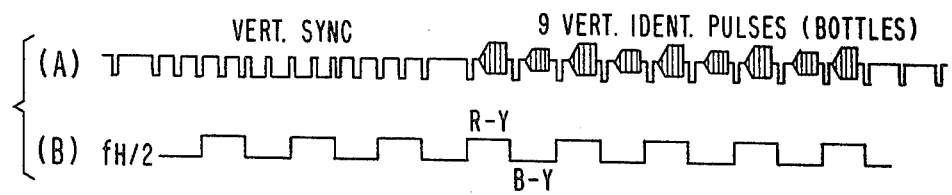
FIG. 8 shows standard SECAM vertical identification pulses and a half line frequency switching signal.

As shown in FIG. 8a the SECAM identification signals are transmitted on nine lines following the vertical equalizing pulses and consist of a linear increase in subcarrier frequency to the highest frequency of maximum deviation $D_R$ (4.756 MHz) for the R-Y line and in a linear decrease in subcarrier frequency to the minimum frequency of maximum deviation $D_B$ (3.9 MHz) for the B-Y line, FIG. 8b shows the half line frequency signal applied to switch 98.

Figure 9:
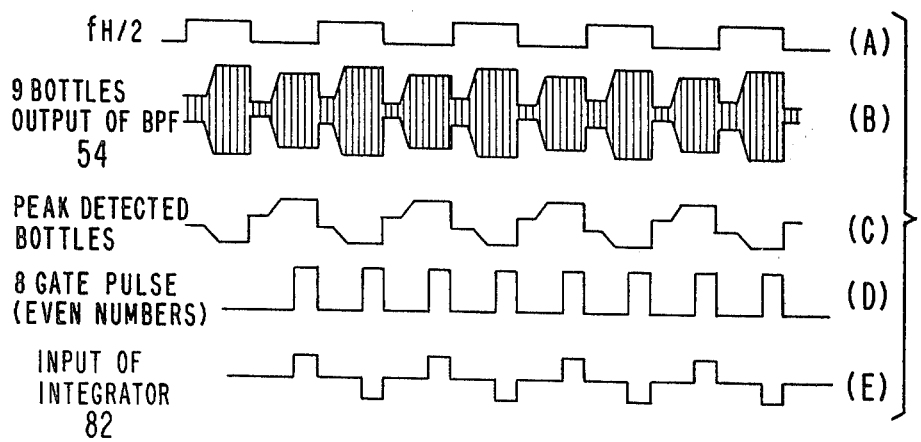
FIG. 9 shows some waveforms present.
Figure 10:
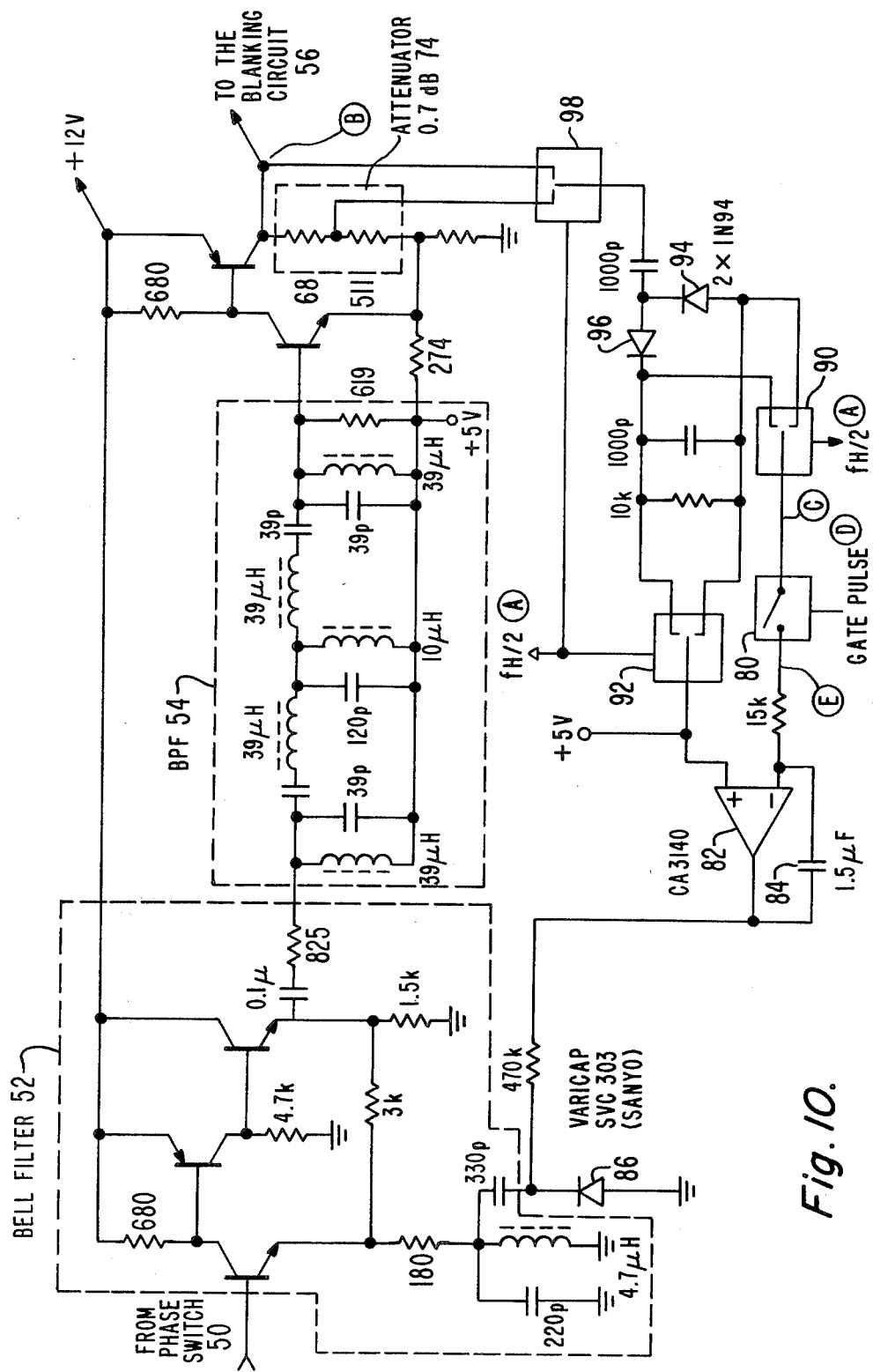
FIG. 10 shows a detailed embodiment of the invention.

FIG. 10 shows the complete circuit of the control circuit 58, bell filter 52, and bandpass filter 54, for use in the RCA Model TK-47 SECAM camera, while FIG. 9 shows some waveforms present therein at correspondingly lettered points. This circuit shows the details of an actual circuit for implementing the block diagram of FIG. 5. Its construction and operation are the same except that it uses $D_R$ and $D_B$, and therefore the same reference numbers have been used. Here the switches 80, 90, 92, and 98 can be RCA integrated circuit type CD 4053. Signal D in FIG. 8d (the gate pulse) is generated in a separate circuit not shown, and consists of 8 (even number) pulses about half a line wide in order to ensure that only the peak deviated bottles (SECAM line identification signals) are sampled. It should be noted that the circuit of FIG. 10 which uses the peak deviation $D_R$ and $D_B$ to control the bell filter only works well if $D_R$ and $D_B$ are very accurate (within approximately ±5 kHz). The SECAME coder shown in FIG. 1 uses two potentiometers, "upper limit" and "lower limit" to adjust $D_R$ and $D_B$, which may be a source of drift and ageing problems. A separate application filed concurrently herewith entitled, "AUTOMATIC DEVIATION LIMIT CONTROL CIRCUIT FOR USE IN SECAM CODERS" application (RCA 73,925) describes an automatic $D_R$-$D_B$—limit control circuit which keeps $D_R$ and $D_B$ constant within a few kHz. This circuit can also be used in the RCA Model TK-47 camera so that the assumption that $D_R$ and $D_B$ are very accurate is true.

What is claimed is:

1. A method for adjusting the frequency response of a bell filter used in a SECAM encoder, said method comprising sampling the amplitude of an output signal from said bell filter, and adjusting the frequency response by providing a control voltage to said filter in accordance with the sampled amplitude.

2. A method as claimed in claim 1, wherein said sampling step comprises detecting the positive and negative peaks of said output signal, alternately applying the detected peaks to a gate, and integrating the signal from said gate.

3. A method as claimed in claim 1, wherein said sampling step comprises sampling the amplitudes of the two undeviated subcarriers of a SECAM signal.

4. A method as claimed in claim 1, wherein said sampling step comprises sampling the amplitudes during the peak deviation of the vertical color identification pulses of a SECAM signal.

5. A circuit for use with a SECAM signal, said circuit comprising a said bell filter having a first input for receiving a SECAM signal, a second control input, and an output means for providing a filtered SECAM signal; and means for sampling the amplitude of said filtered signal and for providing a control voltage to said control input for adjusting the response of said filter in accordance with the sampled amplitude.

6. A circuit as claimed in claim 5, wherein said sampling means comprises means for detecting positive and negative amplitude peaks of said filtered signal, means coupled to said detecting means for alternately providing the detected signals, a gate coupled to said output means, and an integrator coupled to said gate and to said control input.

7. A circuit as claimed in claim 6, wherein said detecting means comprises separate positive and negative peak detectors.

8. A circuit as claimed in claim 6, wherein said detecting means further comprises a single peak detector and means for switching said detector to detect positive and negative peaks.

9. A circuit as claimed in claim 5, wherein said sampling means samples the amplitudes of the two undeviated subcarriers of a SECAM signal.

10. A circuit as claimed in claim 5, wherein said sampling means samples the amplitudes of the peak deviation of the vertical color identification pulses of a SECAM signal.

11. A circuit as claimed in claim 5, further comprising a band pass filter coupled between bell filter and said sampling means.

* * * * *

UNITED STATES PATENT AND TRADEMARK OFFICE
CERTIFICATE OF CORRECTION

PATENT NO. : 4,255,758
DATED : March 10, 1981
INVENTOR(S) : Felix Aschwanden

It is certified that error appears in the above—identified patent and that said Letters Patent is hereby corrected as shown below:

On the Title Sheet, add the following:

[30]   Foreign Application Priority Data

April 5, 1979 [GB] United Kingdom.........12025/79

*Signed and Sealed this*

*Twenty-sixth* Day of *May 1981*

[SEAL]

*Attest:*

RENE D. TEGTMEYER

*Attesting Officer*   *Acting Commissioner of Patents and Trademarks*